(12) United States Patent
Lu et al.

(10) Patent No.: US 9,666,863 B2
(45) Date of Patent: May 30, 2017

(54) NANO SILICON-CARBON COMPOSITE MATERIAL AND PREPARATION METHOD THEREOF

(71) Applicant: China Automotive Battery Research Institute Co., Ltd., Beijing (CN)

(72) Inventors: Shigang Lu, Beijing (CN); Juanyu Yang, Beijing (CN); Xingming Wang, Beijing (CN); Haiyang Ding, Beijing (CN); Zhefeng Gao, Beijing (CN)

(73) Assignee: CHINA AUTOMOTIVE BATTERY RESEARCH INSTITUTE CO., LTD., Beijing (CN)

( * ) Notice: Subject to any disclaimer, the term of this patent is extended or adjusted under 35 U.S.C. 154(b) by 135 days.

(21) Appl. No.: 14/357,244

(22) PCT Filed: Nov. 9, 2012

(86) PCT No.: PCT/CN2012/084351
§ 371 (c)(1),
(2) Date: May 9, 2014

(87) PCT Pub. No.: WO2013/067956
PCT Pub. Date: May 16, 2013

(65) Prior Publication Data
US 2014/0302396 A1    Oct. 9, 2014

(30) Foreign Application Priority Data

Nov. 10, 2011 (CN) .......................... 2011 1 0354777
Nov. 8, 2012 (CN) .......................... 2012 1 0442906

(51) Int. Cl.
*H01M 4/36* (2006.01)
*H01M 4/583* (2010.01)
(Continued)

(52) U.S. Cl.
CPC ............. *H01M 4/364* (2013.01); *C01B 31/36* (2013.01); *C25B 1/006* (2013.01); *H01M 4/133* (2013.01);
(Continued)

(58) Field of Classification Search
None
See application file for complete search history.

(56) References Cited

U.S. PATENT DOCUMENTS 6,303,094 B1    10/2001   Kusunoki et al.
2002/0164479 A1  11/2002   Matsubara et al.
(Continued)

FOREIGN PATENT DOCUMENTS

CN         101609891 A       12/2009
CN         102214817 A       10/2011
(Continued)

OTHER PUBLICATIONS

A. Esmanski et al., "Silicon Inverse-Opal-Based Macroporous Materials as Negative Electrodes for Lithium Ion Batteries," Advanced Functional Materials, 2009, 19, pp. 1999-2010, www.amf-journal.de.
(Continued)

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

The invention relates to a nano silicon-carbon composite negative material for lithium ion batteries and a preparation method thereof. A porous electrode composed of silica and carbon is taken as a raw material, and a nano silicon-carbon composite material of carbon-loaded nano silicon is formed by a molten salt electrolysis method in a manner of silica in-situ electrochemical reduction. Silicon and carbon of the
(Continued)

material are connected by nano silicon carbide, and are metallurgical-grade combination, so that the electrochemical cycle stability of the nano silicon-carbon composite material is improved. The preparation method of the nano silicon-carbon composite material provided by the invention comprises the following steps: compounding a porous block composed of carbon and silica powder with a conductive cathode collector as a cathode; using graphite or an inert anode as an anode, and putting the cathode and anode into $CaCl_2$ electrolyte or mixed salt melt electrolyte containing $CaCl_2$ to form an electrolytic cell; applying voltage between the cathode and the anode; controlling the electrolytic voltage, the electrolytic current density and the electrolytic quantity, so that silica in the porous block is deoxidized into nano silicon by electrolytic reduction, and the nano silicon-carbon composite material for lithium ion batteries is prepared at the cathode.

22 Claims, 3 Drawing Sheets

(51) Int. Cl.

| | | |
|---|---|---|
| *H01M 10/0525* | (2010.01) | |
| *H01M 4/133* | (2010.01) | |
| *H01M 4/134* | (2010.01) | |
| *C25B 1/00* | (2006.01) | |
| *H01M 4/38* | (2006.01) | |
| *C01B 31/36* | (2006.01) | |
| *H01M 4/587* | (2010.01) | |
| *H01M 4/48* | (2010.01) | |
| *H01M 4/58* | (2010.01) | |
| *H01M 10/052* | (2010.01) | |
| *B82Y 30/00* | (2011.01) | |
| *H01M 4/04* | (2006.01) | |
| *H01M 4/1393* | (2010.01) | |
| *H01M 4/1395* | (2010.01) | |

(52) U.S. Cl.
CPC ............ *H01M 4/134* (2013.01); *H01M 4/386* (2013.01); *H01M 4/483* (2013.01); *H01M 4/58* (2013.01); *H01M 4/583* (2013.01); *H01M 4/587* (2013.01); *H01M 10/0525* (2013.01); *B82Y 30/00* (2013.01); *H01M 4/0438* (2013.01); *H01M 4/1393* (2013.01); *H01M 4/1395* (2013.01); *H01M 10/052* (2013.01)

(56) References Cited

U.S. PATENT DOCUMENTS

| | | | |
|---|---|---|---|
| 2009/0029256 A1* | 1/2009 | Mah | H01B 1/24 |
| | | | 429/231.8 |
| 2010/0243951 A1 | 9/2010 | Watanabe et al. | |
| 2010/0261059 A1 | 10/2010 | Im et al. | |
| 2014/0234722 A1* | 8/2014 | Kyotani | B82Y 30/00 |
| | | | 429/231.8 |

FOREIGN PATENT DOCUMENTS

| | | | |
|---|---|---|---|
| EP | 1323783 | A2 | 7/2003 |
| EP | 2343403 | A1 | 7/2011 |
| JP | 2010-282942 | A | 12/2010 |
| KR | 10-2009-0011888 | A | 2/2009 |
| WO | WO 2010/138617 | A2 | 12/2010 |

OTHER PUBLICATIONS

A. Magasinki, et al., "High-performance lithium-ion anodes using a hierarchical bottom-up approach"—Nature Materials, Online publication, Mar. 14, 2010, DOI:10.1038/NMAT2725.

C. Chan et al., "High-performance lithium battery anodes using silicon nanowires," 2008 Nature nanotechnology, Jan. 2008, vol. 3, Department of Chemestry, Stanford University, Stanford, California 94305, (pp. 31-35) Published online Dec. 16, 2007, doi:10.1038/nnano/2007.411.

L-F Cui et al., "Carbon-Silicon Core-Shell Nanowires as High Capacity Elecrode for Lithium Ion Batteries," Nano Letters 2009, vol. 9, No. 9, pp. 3370-3374, Department of Materials Science and Engineering, Stanford University, Stanford, California 94395.

Extended European Search Report, dated Jun. 26, 2015, for European Application No. 12848316.1.

Japanese Office Action, dated May 12, 2015, for Japanese Application No. 2014-540308, together with an English translation thereof.

Korean Office Action, dated Jan. 26, 2016, for Korean Application No. 10-2014-7015769, together with an English translation thereof.

Korean Office Action, dated Jul. 17, 2015, for Korean Application No. 10-2014-7015769, together with an English translation thereof.

\* cited by examiner

NANO SILICON-CARBON COMPOSITE MATERIAL AND PREPARATION METHOD THEREOF

FIELD OF INVENTION

The present invention relates to a nano silicon-carbon composite material for lithium ion batteries and a preparation method thereof.

BACKGROUND OF THE INVENTION

With wide application of various portable electronic equipments and rapid development of an electric automobile, dramatic increase of requirements and performance requirements on their power system-chemical power source, lithium ion batteries are widely applied to the field of mobile electronic terminal equipment with the advantages of large specific energy, high work voltage, low self-discharge efficiency and the like. Furthermore, lithium ion batteries develop towards the direction of higher energy density along with the increase of requirements on a high-specific energy power source. Currently, commercialized lithium ion batteries adopt graphite carbon materials as negative materials in general. It is difficult to obtain breakthrough by adopting an improved battery preparation technology to improve the performance of the battery due to limit of the low theoretical electrochemical capacity (theoretical capacity 372 mAh/g) of the battery. Development of a novel lithium ion battery electrode material with high specific capacity is urgent. Metals such as Si, Sn, Sb and the like are high-capacity negative materials which are much studied by people, wherein the silicon becomes one of preferred negative materials of the next generation of power battery with high specific energy due to the advantages of the theoretical electrochemical capacity (theoretical capacity 4200 mAh/g) which more than 10 times higher than that of the carbon material widely applied at present, low lithiation potential (lower than 0.5V), in existence of common inserting of solvent molecules in the inserting process, abundance in crust and the like. But due to poor conductive performance of the silicon material, and serious volume effect (rate of volume change is 280%-310%) generated during electrochemical lithium insertion and extraction, cracking or crumbling of the material resulted in separation of electrode materials and separation between electrode materials and a current collector, which lead to loss of electric contact, and this structural and electronic degradation thereby leads to fast capacity fading and rapid reduction of the cycle performance of the electrode.

At present, people propose two methods for solving the problem as follows: 1, silicon nanocrystallization, with reduction of particles, the volume change of silicon can be reduced to a certain extent, and internal stress of the electrode is reduced, but the nanosize material is easily aggregated during cycling, it is insufficient to make performance improvement of the practical battery; 2, a nanosize silicon-carbon composite material is adopted, namely nanosize silicon or silicon alloy material with electrochemical activity is inserted or loaded to carbon material. On one hand, the conductive property of the active silicon material can be improved by the carbon material, and on the other hand, the carbon material can be a "buffer skeleton" to disperse and buffer the internal stress of the electrode of the silicon material in the charge and discharge processes caused by volume change, so that the nano silicon-carbon composite material has good cycle stability. Recently, researchers reports (*Nature*, 2008, 3:31-35) that a silicon nanowire used as negative material for lithium ion batteries not only has the electrochemical capacity close to the theoretical value and good high-rate charge and discharge performances, but also has stable cyclicity. The analysis supports that crystalline silicon in the charge and discharge processes is transformed into amorphous silicon, resulting in phase constituent and structure change of the nanowire due to one-dimensional conduction of electrons in the silicon nanowire along the radial direction, but the one-dimensional structural characteristics are kept invariable, so that good electrical conductivity of the electrode and the stability of the structure are maintained. A crystal structure of the nano silicon is destroyed by lithium ion insertion at normal temperature, so as to a compound of lithium and silicon in a metastable state is generated; and the crystal silicon is transformed into amorphous silicon when lithium is extraction, resulting in volume change, and leading to fading of the battery cycle performance. A research result shows that the amorphous silicon has better capacity retention and cycle performance. On the basis, Cui Y et al (*Nano Lett.*, 2009, 9:3370-3374, WO2010/138617) propose that the silicon nanowire with a core-shell structure of which the core is crystalline silicon and the outer layer is amorphous silicon is prepared on a stainless steel substrate by adopting a chemical vapor deposition method, and used as negative material for lithium ion batteries. The core of the crystalline silicon in the core-shell structure silicon material is used as a skeleton and an electric conductor in the charge and discharge processes; and the amorphous silicon outer layer is using as an active substance for lithium ion insertion and extraction. According to the core-shell structure silicon nanowire negative material, the amorphous silicon can ensure the structure stability in the charge and discharge processes, so that the electric conductivity of the core of the crystalline silicon can not be destroyed. Therefore, the cycle stability of the core-shell structure material is further improved in comparison with the crystalline silicon nanowire. Three-dimensional porous carbon supported nano silicon particles (*Nature Materials*, 2010, 9:353-358) are prepared by Yushin G and the like by adopting the same method. When the composite structure silicon material is used as the negative material for lithium ion batteries, the three-dimensional porous carbon is taken as the skeleton material, so that on one hand, an effective conductive network can be supplied for the nano silicon particles, and on the other hand, volume expansion of the nano silicon particles also can be buffered by the flexibility of the porous carbon, so that the volume effect of the silicon material in the charge and discharge processes can be inhibited to a certain extent, meanwhile, the electric conductivity of the silicon material is improved, thereby, the cycle stability of the material is improved. Three-dimensional porous carbon-coated silicon composite structure silicon material is prepared by Esmanski A and the like by adopting a template method (*Adv. Funct. Mater.*, 2009, 19:1999-2010). When the material is used as the negative material for lithium ion batteries, the coated carbon can supply a conductive network and buffer the volume effect of nano silicon particles, meanwhile, the three-dimensional porous structure also can contain the volume effect of the silicon material in the charge and discharge cycle process, and has good cycle stability. Thus, we can know that the carbon material mainly plays a role of conducting and buffering the volume expansion of the silicon material in the nano silicon-carbon composite material, the nano silicon material just can develop the electrochemical capacity of the silicon material by effectively combining with the carbon material in the charge and discharge processes, if the nano silicon material falls off from the carbon material in the repeated charge and discharge processes due to expansion and contraction for a plurality of times, the silicon material cannot develop the electrochemical capacity due to loss of the electric contact. A research shows that these nano silicon-carbon composite materials cannot effectively inhibit huge volume effect of the silicon material in a long-term cycle process due to the fact that the nano silicon is deposited on a carbon matrix or the carbon is coated on a nano silicon matrix, and the ductility of the flexible carbon material is limited. Along with cycle, physical combination of the silicon and the carbon becomes worse and worse, resulting in loss of electric contact on separation of the silicon and the carbon material, so that the cycle stability of the material becomes poor, and cannot meet the requirements of the cycle stability of negative material for lithium ion batteries. In conclusion, microstructure of the nano silicon material and effective combination between the nano silicon material and the carbon material are key factors of affecting the performance of the silicon-carbon composite negative material. In addition, the existing methods for preparing these nano silicon-carbon composite materials mainly comprise a chemical vapor deposition method, thermal vapor deposition method, high-temperature pyrolysis, high-energy ball milling and so on. These preparation methods relate complicated technological processes (for example, a template method), or it is difficult to control the process, or the required equipment is expensive (for example, a chemical vapor deposition method), so that it is difficult to achieve scale-up production.

SUMMARY OF THE INVENTION

The invention is directed to overcome the defects of the existing silicon-carbon composite material when being used as negative material for lithium ion batteries, where separation of the silicon and the carbon material due to the huge volume effect of the silicon material during the lithium ion insertion and extraction results in poor cycle stability of the materials, and provide a nano silicon-carbon composite material with good cycle stability. Meanwhile, the invention also provides a preparation method of the nano silicon-carbon composite material, which is short in production process, free of pollution, simple to operate, available in raw materials, cheap in equipment and easy to achieve continuous production.

The invention adopts the technical solution as follows:

The invention provides a nano silicon-carbon composite material for lithium ion batteries, characterized by comprising a carbon matrix, nano silicon dispersed on the carbon matrix, nano silicon carbide SiC dispersed on the interface of the carbon matrix and the nano silicon, and silicon oxide SiOx coated on the surface of the nano silicon except for the interface connected with the carbon matrix, wherein 0<x≤2. The percentage of the components is as follows: 2-40% of nano silicon, 55-90% of carbon, 0.1-3% of nano SiC and 1-5% of silicon oxide SiOx; the mass percent of the nano silicon further preferably is 5-35%; the mass percent of the nano silicon further preferably is 60-85%.

The carbon matrix in the nano silicon-carbon composite material for lithium ion batteries provided by the invention is in at least one selected from the group consisting of a spherical shape, a similar spherical shape, a flake shape, a linear shape and a tubular shape; the size of the carbon matrix is 0.01-50 μm; the nano silicon is in at least one selected from the group consisting of a spherical particle shape, a linear shape, a tubular shape and a flake shape; the nano silicon is at least one selected from the group consisting of a nano silicon wire, a nano silicon spherical particle, a nano silicon tube and a nano silicon sheet; the particle size of the nano silicon spherical particle is smaller than 100 nm; the diameter of the nano silicon wire is smaller than 100 nm; the diameter of the nano silicon tube is smaller than 100 nm; the thickness of the nano silicon sheet is smaller than 100 nm; the nano silicon carbide SiC is in at least one selected from the group consisting of a granular shape, a linear shape and a flake shape; the particle size of the granular nano SiC is smaller than 100 nm; the diameter of the linear nano SiC is smaller than 100 nm; the thickness of the flake nano SiC is smaller than 100 nm; the silicon oxide SiOx is coated on the surface of the nano silicon except for the interface connected with the carbon matrix, 0<x≤2, and the thickness of the coating layer is 1-5 nm.

The invention provides a preparation method of the nano silicon-carbon composite material, comprising the following concrete steps: firstly, preparing silica sol from silica powder, and then adding a carbon particle material to the silica sol, wherein the mass percent of the silica powder is 10-90 wt %, the mass percent of the carbon particle material is 90-10 wt %, and the total mass of the silica powder and the carbon particle material is 100 wt %; evenly mixing, and forming a mixture of carbon and silica by drying and crushing; forming a porous block from the mixture in a hot-pressing manner, or sintering the mixture into a porous block after mold pressing or mold filling; controlling the porosity, the density and the resistivity of the porous block; compounding the porous block composed of the carbon and the silica with a conductive cathode collector as a cathode, using graphite or an inert anode as an anode, and putting the cathode and anode into $CaCl_2$ electrolyte or mixed salt melt electrolyte containing $CaCl_2$ to form an electrolytic cell; applying electrolytic direct current voltage between the cathode and the anode, and controlling the electrolytic voltage, the electrolytic current density and the electrolytic quantity, so that the silica in the porous block is deoxidized into the nano silicon by electrolytic reduction, and the nano silicon-carbon composite material for lithium ion batteries is prepared at the cathode.

The particle size of the silica powder is from 10 nm to 1 μm.

The carbon particle material is selected from at least one selected from the group consisting of natural graphite, artificial graphite, amorphous carbon and carbon nano tube.

The particle size of the carbon particle material is from 10 nm to 50 μm.

The hot-pressing temperature is 900-1400° C.; the hot-pressing pressure is 8-40 Mpa; the heat preservation time is 1-5 hours; the sintering temperature is 800-1500° C.; and the sintering time is 1-8 hours.

The porosity of the porous block is 5-65 vol %.

The density of the porous block is 0.80-2.10 g/cm$^3$.

The resistivity of the porous block is 0.001-100 Ω·cm.

The mixed salt melt electrolyte containing $CaCl_2$ is $CaCl_2+MY^1$, wherein the molar percent of the $CaCl_2$ is 40-95%; the allowance is $MY^1$; M is Ba, Li, Al, Cs, Na, K, Mg, Rb, Be or Sr; $Y^1$ is Cl or F.

The electrolyte comprises calcium oxide CaO, and the molar percent of the calcium oxide in the total mass of the electrolyte is 0.001-20%.

Electrolysis is carried out at the temperature of 500-1,000° C.

The electrolytic voltage is lower than the theoretical decomposition potential of the electrolyte; the electrolytic current density is greater than the background current density of the electrolytic cell; and the electrolytic time is the time required for achieving the required theoretical electrolytic quantity or more by the required theoretical electrolytic quantity.

The invention provides a lithium ion battery comprising a negative electrode, a positive electrode and non-aqueous electrolyte, wherein the negative electrode comprises the nano silicon-carbon composite material disclosed by the invention.

The invention has the characteristics as follows:
(1) The carbon-silicon ratio in the nano silicon-carbon composite material can be adjusted by adjusting the ratio of the material silica to the carbon, and the insertion-lithium capacity namely the specific capacity of the nano silicon-carbon composite material can be adjusted.
(2) The silica is electroreduced into the nano silicon and the nano silicon-carbon composite material is produced in situ by controlling the porosity, the density and the resistivity of a porous block composed of the silica and the carbon, and during the process the structure and the uniformity of the material formed can be effectively controlled.
(3) The content of silicon carbide in the electrolytic product namely the nano silicon-carbon composite material can be adjusted by controlling the electrolytic voltage, the electrolytic current density and the electrolytic quantity, and the electrochemical cycle stability of the nano silicon-carbon composite material can be improved by controlling the metallurgical bonding degree between the silicon and the carbon.
(4) The raw materials used are abundant in source, and low in price; the raw materials and the preparation process are free of pollution on the environment.
(5) The technology is simple in process, simple and convenient to operate, and simple in equipment.
(6) The raw materials and the product are added or removed in a solid form, and continuous production is easily achieved.

DETAILED DESCRIPTION OF THE INVENTION

Figure 1:
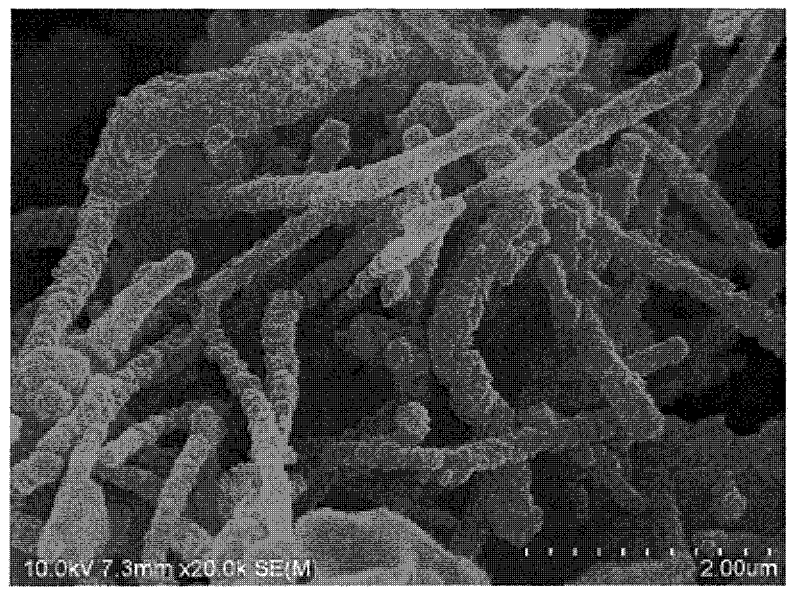
FIG. 1 is a scanning electron microscope (SEM) image of the carbon fiber-loaded nano spherical silicon-carbon composite material prepared from the carbon fiber and silica mixture as raw materials at 900° C. disclosed by the invention in the embodiment 3.

The invention is described by further combining the figures with the embodiments as follows.

These descriptions just aim at further explaining but not limiting the invention.

The invention provides a nano silicon-carbon composite material for lithium ion batteries, wherein the material contains carbon matrix, nano silicon dispersed on the carbon matrix, nano silicon carbide SiC dispersed on the interface of the carbon matrix and the nano silicon, and silicon oxide SiOx coated on the surface of the nano silicon except for the interface connected with the carbon matrix, wherein $0 < x \leq 2$.

The composite material is prepared by the steps as follows: the silica sol is prepared from silica powder, and then the carbon particle material is added to the silica sol, wherein the mass percent of the silica powder is 10-90 wt %; the mass percent of the carbon particle material is 90-10 wt %; the total mass of the silica powder and the carbon particle material is 100 wt %; the porous block of the carbon and the silica is prepared by the steps of mechanically kneading, evenly mixing, drying, crushing and molding; the silica is electrochemically reduced into the nano silicon and the nano silicon-carbon composite material is produced in situ by controlling the porosity, the density and the resistivity of the porous block composed of the silica and the carbon; and during the process the structure and the uniformity of the material formed are effectively controlled; meanwhile, the electroreduction speed of the silica is controlled, so as to achieve dispersing uniformity, the carbon interface bonding strength and the silicon oxide coating layer thickness of the nano silicon material on the surface of the carbon matrix by controlling the electrolytic voltage, the electrolytic current density and the electrolytic quantity, and utilizing the characteristics of silica electroreduction reaction, namely just utilizing the characteristics of three-phase interface electrolytic reduction of silica (silicon source phase)/silicon or carbon (conductive phase)/electrolyte (ion phase); the bonding degree of the nano silicon and the carbon material is mainly determined by the distribution and the content of the silicon carbide at the carbon-silicon interface. A little of high-hardness silicon carbide can be formed at the interface of the joint of the nano silicon and the carbon, and is metallurgical-grade combination, so that the binding force between the nano silicon and the carbon material is greatly enhanced; meanwhile, compared with a flexible carbon material, a little of rigid silicon carbide can greatly reduce the volume change of the nano silicon-carbon composite material in the lithium insertion-extraction processes. Thereby, the silicon and the carbon in the nano silicon-carbon composite material are not separated from each other during an increase of cycle.

Therefore, the cycle stability of the nano silicon-carbon composite material is improved.

The nano silicon in the material is prepared from the silica in the molten salt by an electrochemical method, while the carbon matrix is obtained from a carbon material in the raw materials. Therefore, the ratio of the nano silicon to the carbon matrix in the nano silicon-carbon composite material can be adjusted by adjusting the ratio of the silica and the carbon in the raw materials. The carbon matrix in the silicon-carbon composite material mainly plays the roles of conducting and buffering the volume effect of the silicon material, and the electrochemical specific capacity is mainly supplied by the nano silicon, so that the insertion-lithium capacity of the composite material can be adjusted by controlling the ratio of the nano silicon and the carbon matrix in the nano silicon-carbon composite material. If the silicon-carbon ratio is over-low (Si %<2 wt %), the theoretical specific capacity of the nano silicon-carbon composite material is only 430 mAh/g and close to the theoretical specific capacity 372 mAh/g of the pure graphite cathode, and cannot meet the requirements of high specific energy of the battery. If the silicon-carbon ratio is over-high, the specific capacity of the nano silicon-carbon composite material is also high under the situation that the other conditions are completely the same. But this could bring about two issues that on the one hand, due to the increase of mass percent of nano silicon in the nano silicon-carbon composite material, total volume effect resulted by nano silicon also increases so that cycle performance of the composite material is influenced; on the other hand, the nano silicon content in the composite material is over-high, so that a part of nano silicon cannot be combined with the carbon matrix, and the electrical conductivity of the part of silicon material is poor; meanwhile, the part of silicon material cannot form metallurgical-grade effective combination with the carbon, so that the volume change of silicon caused by insertion-extraction lithium is more serious. Thus, the cycle performance of batteries which use the nano silicon-carbon composite material is poor.

The silicon carbide in the nano silicon-carbon composite material is formed in the molten salt electrolysis process. The reaction of block carbon and block silicon which forms the silicon carbide generated is thermodynamic spontaneous reaction at normal temperature, but the dynamic reaction of the block silicon and the block carbon just can be generated only if the temperature is above 1400° C. in general. The nano silicon is generated through electrochemical reaction in an in-situ manner in the application with high reaction activity, so that the nano silicon and the carbon material in the raw materials can slowly generate a little of nano silicon carbide by chemical reaction after being soaked for a long period of time in the molten salt. In fact, the silicon carbide just can be generated only in the place in which the nano silicon and the carbon material exist at the same time. The generated silicon carbide can limit the volume change of the silicon material in the nano silicon-carbon composite material in the process of insertion-extraction lithium due to having high hardness and high strength, so that the silicon and the carbon in the nano silicon-carbon composite material are not separated from each other during an increase of the cycle index, and the bonding degree of monatomic silicon and monatomic carbon is greatly improved. Thus, the cycle stability of the nano silicon-carbon composite material is improved. But for the silicon carbide does not have electrochemical activity, the specific capacity of the nano silicon-carbon composite material is reduced by over-high content of the silicon carbide. Therefore the content of the silicon carbide in the nano silicon-carbon composite material should be possibly controlled. For the dynamic reaction of the silicon carbide is difficulty carried out, and just can be slowly generated after being soaked for a long period of time in the molten salt. Therefore, the electrolytic reduction rate of the silica is controlled by controlling the electrolytic voltage, the electrolytic current density, the electrolytic quantity and the electrolytic temperature, thereby the content of the silicon carbide in the electrolytic product, namely the nano silicon-carbon composite material can be adjusted, so that the metallurgical bonding degree between the silicon and the carbon is controlled, and the target of improving the electrochemical cycle stability of the nano silicon-carbon composite material is achieved under the premise of ensuring the specific capacity of the nano silicon-carbon composite material.

The carbon matrix in the nano silicon-carbon composite material is from the carbon material in the raw material, and can be a common graphite negative material in the field of lithium ion batteries, such as natural graphite, artificial graphite, mesocarbon microspheres and the like, and also can be a conductive carbon material for lithium ion batteries, such as acetylene black, carbon black, carbon fiber or carbon tube and the like. In addition, the carbon material can be one or more of graphite negative materials and conductive carbon. For the carbon matrix in the nano silicon-carbon composite material is the residual carbon material of the material carbon particles after reacting with the nano silicon to generate the silicon carbide in the molten salt, and the chemical constituent, the morphology, the size and the structure of the carbon matrix have succession together with the raw material carbon particles, and are the same as those of the material carbon particles basically.

The silicon oxide SiOx coating layer on the nano silicon surface in the nano silicon-carbon composite material is from the silica which is not completely deoxidized in the raw materials, or formed in the post-treatment process through second oxidizing reaction of the nano silicon which is generated by reduction in the electrolytic product of nano silicon-carbon composite material, so that the silicon oxide is coated on the surface of the nano silicon. The content of the silicon oxide in the electrolytic product of nano silicon-carbon composite material can be adjusted by controlling the electrolytic quantity, namely the electrolytic time. If the electrolytic time is controlled enough, the raw material silica can be thoroughly electrolyzed, but the electrolytic temperature of the molten salt is 500V or more in general, for the reduced nano silicon has high activity, when the electrolytic product is taken out from the electrolytic cell the nano silicon surface may be partially oxidized in washing process, so that the silicon oxide always exists on the surface of the nano silicon material, but the thickness of the silicon oxide coating layer just is 1-5 nm in general. For the silicon oxide in the nano silicon-carbon composite material can be inserted with lithium, the formed lithium silicate coated on the surface of the nano silicon not only has good electrical conductivity, but also can effectively limit the volume change of silicon in the process of insertion-extraction lithium. Therefore, the silicon oxide in the nano silicon-carbon composite material is favorable to improve the cycle stability of the silicon-carbon composite material, but the lithium silicate formed by inserting lithium into a silicon oxide compound cannot completely extract lithium, so that the first coulombic efficiency of the nano silicon-carbon composite material is low.

Therefore, the nano silicon-carbon composite material comprises the following components by mass percent: 2-40% of nano silicon, 55-90% of carbon, 0.1-3% of nano SiC and 1-5% of silicon oxide SiOx, wherein the mass percent of the nano silicon further preferably is 5-35%; the mass percent of the carbon further preferably is 60-85%.

The nano silicon-carbon composite material disclosed by the invention has the structural characteristics as follows: the carbon matrix is in at least one selected from the group consisting of a spherical shape, a similar spherical shape, a flake shape, a linear shape and a tubular shape; the size of the carbon matrix is 0.01-50 µm; the nano silicon is in at least one selected from the group consisting of a particle shape, a linear shape, a tubular shape and a flake shape; the nano silicon is at least one selected from the group consisting of a nano silicon wire, a nano silicon particle, a nano silicon tube and a nano silicon sheet; the particle size of the nano silicon particle is smaller than 100 nm; the diameter of the nano silicon wire is smaller than 100 nm; the diameter of the nano silicon tube is smaller than 100 nm; the thickness of the nano silicon sheet is smaller than 100 nm; the nano silicon carbide SiC is in at least one selected from the group consisting of a granular shape, a linear shape and a flake shape; the particle size of the granular nano SiC is smaller than 100 nm; the diameter of the linear nano SiC is smaller than 100 nm; the thickness of the flake nano SiC is smaller than 100 nm; the silicon oxide SiOx coated on the surface of the nano silicon except for the interface connected with the carbon matrix, wherein $0<x\leq2$, and the thickness of the coating layer is 1-5 nm.

Consequently, the constituent and the structure of the nano silicon-carbon composite material are closely related to the electrochemical property of the material. When the porous block composed of the silica and the carbon material is used as materials to carry out electroreduction to prepare the nano silicon-carbon composite material, the process that the silica is electrochemically reduced to form the nano silicon has the characteristics that the electroreduction just can be subjected on the three-phase interface of silica (silicon source phase)/silicon or carbon (conductive phase)/electrolyte (ion phase). Therefore the key factors affecting the constituent, the structure and the electrochemical properties of the nano silicon, the carbon, the silicon carbide and the silicon oxide in the nano silicon-carbon composite material are as follows: 1) the constituent, the structure and the physical property (such as the porosity, the aperture, the density and the resistivity) of the porous block composed of the carbon and the silica, and 2) the electrolytic process conditions of molten salt electrolysis (for example, the electrolytic voltage, the electrolytic quantity, the electrolytic current density, the electrolytic temperature, the electrolytic component and the like).

How will the performance of the porous block composed of the carbon and the silica affect the nano silicon-carbon composite material? Firstly, the silica sol is prepared from the silica power, and then the carbon particle material is added to the silica sol, and evenly mixed to prepare the silica/carbon mixture in manners of drying and crushing. The mixture is prepared into the porous block in a hot-pressing manner, or sintered into the porous block after mold pressing or mold filling and molding. The temperature and the pressure of the molding technology in the preparation process of the porous block have decisive influence on the porosity of a porous electrode. For example, hot-pressing molding, 40 wt % of nano $SiO_2$ powder of which the purity is 99.9% and 60 wt % of similar spherical graphite of which the particle size is 10-21 μm are taken as the raw materials, when the hot-pressing pressure is 20 Mpa, the holdup time is 1 h, and the molding temperature is 900° C. and 1400° C. respectively, the porosities of the porous block respectively are 63 vol % and 20 vol %. The silica in the porous block molded at 900° C. with porosity of 63 vol % is still kept in a single particle morphology, so that a plurality of pores exist in the silica particles; while the silica in the porous block molded at 1400° C. with porosity of 20 vol % is sintered into a silica block at high temperature, so that a few of pores exist in the silica. The difference of the silica morphology and pore structure directly affects the constituent, the morphology and the structure of the electrolytic product nano silicon-carbon composite material. Under the same electrolytic process conditions, the nano silicon in the nano silicon-carbon composite material prepared by electroreduction from the porous block molded at 900° C. with the porosity of 63 vol %, mainly exists in spherical nano particles and merely exist in silicon nanowires, of which the first insertion-lithium capacity of the nano silicon-carbon composite material is 1108 mAh/g, the first coulombic efficiency is 73%, and the capacity retention ratio after cycling for 100 weeks is 90%. While the nano silicon-carbon composite material prepared by electroreduction of the porous block molded at 1400° C. with the porosity of 20 vol % takes the silicon nanowire as a main constituent, of which the first insertion-lithium capacity is 1132 mAh/g, the first coulombic efficiency is 86%, and the capacity retention ratio after cycling for 100 weeks is 93%. When the porosity of the porous block composed of the carbon and the silica is large, for example, greater than 65 vol %, the silicon produced by electroreduction from the silica causes 50 vol % of reduction in volume due to oxygen being taken off in the electrolytic process, and the strength of the porous block is not enough and cannot be taken out from the molten salt completely due to an increase of the porosity of the porous block composed of the carbon and the silicon after reduction. When the porosity of the porous block composed of the carbon and the silica is small, for example, smaller than 5 vol %, a few of pores through which the molten electrolyte calcium chloride passes exist in the porous block, the speed of the electrolytic reduction reaction is reduced, and the electrolytic time is over-long, resulting in the content of silicon carbide in the product being over-high.

The properties of the nano silicon-carbon composite material obtained under different electrolytic process conditions of the molten salt are different even if the constituent, the structure and the physical property of the porous block are the same. The porous block composed of 40 wt % of $SiO_2$ and 60 wt % of carbon with the porosity of 23 vol % is subjected to electrolysis, wherein the electrolysis temperature is 850° C., the electrolytic voltage is 2.7V, and the electrolytic quantity is respectively controlled to be 1.2 times and 1.5 times of the theoretical electric quantity, so as to prepare the nano silicon-carbon composite material. The first insertion-lithium capacity of the nano silicon-carbon composite material with 1.2 times of the theoretical electric quantity is 1112 mAh/g, the first coulombic efficiency is 86%, and the capacity retention ratio after cycling for 100 weeks is 91%; while the first insertion-lithium capacity of the nano silicon-carbon composite material prepared with 1.5 times of the theoretical electric quantity is 1148 mAh/g, the first coulombic efficiency is 87%, and the capacity retention ratio after cycling for 100 weeks is 90%.

The preparation method of the nano silicon-carbon composite material provided by the invention comprises the steps as follows:

1. The invention provides a preparation method of the nano silicon-carbon composite material, comprising the following concrete steps: compounding the porous block composed of the carbon and the silica with a conductive cathode collector as a cathode; using graphite or an inert anode as an anode, and putting the cathode and the anode into $CaCl_2$ electrolyte or mixed salt melt electrolyte containing $CaCl_2$ to form an electrolytic cell; applying electrolytic direct current voltage between the cathode and the anode; controlling the electrolytic voltage, the electrolytic current density and the electrolytic quantity, so that the silica in the porous block is deoxidized into the nano silicon in an electrolysis manner, and the nano silicon-carbon composite material for lithium ion batteries is prepared at the cathode.

2. The preparation processes of the porous block composed of the carbon and the silica powder are as follows: firstly, adding 10 nm to 1 μm of silica powder to one or two selected from the group consisting of distilled water, absolute ethyl alcohol, ethylene glycol, propyl alcohol and the like of which the mass percent is 60%-400%, wherein the mass percent of 60%-400% of distilled water, absolute ethyl alcohol, ethylene glycol, propyl alcohol and the like is relative to the 100% mass percent of the silica powder; and preparing silica sol in a planetary agitation tank with the agitation time of 1-12 hours; then adding the carbon particle material of which the particle size is 10 nm to 50 μm to the silica sol, wherein the mass percent of the silica powder is 10-90 wt %; the mass percent of the carbon particle material is 90-10 wt %; and the total mass of the silica powder and the carbon particle material is 100 wt %; evenly mixing by adopting a dough kneading machine or a kneading machine and the like to obtain a mixed slurry; drying the mixed slurry in an air atmosphere for 6-24 hours, and forming the porous block from the dried material in a hot pressing manner after mechanical crushing, wherein the hot pressing temperature is 900-1400° C.; the hot pressing pressure is 8-40 Mpa; and the heat preservation time is 1-5 hours; or molding the wet mixed slurry by directly molding pressing or mold filling, then sintering in an inert protective atmosphere, so as to obtain the porous block, wherein the sintering temperature is 800-1500° C., and the sintering time is 1-8 hours.

3. The carbon particle material is selected from at least one selected from the group consisting of natural graphite, artificial graphite, amorphous carbon and a carbon nano tube.

4. The porosity of the porous block is 5-65 vol %; the density of the porous block is 0.80-2.10 g/cm$^3$; the resistivity of the porous block is 0.001-100 Ω·cm.

5. The mixed salt melt electrolyte containing $CaCl_2$ is $CaCl_2+MY^1$, wherein the mole percent of the $CaCl_2$ is 40-95%; the allowance is $MY^1$; M is Ba, Li, Al, Cs, Na, K, Mg, Rb, Be or Sr; $Y^1$ is Cl or F.

6. The electrolyte comprises calcium oxide CaO, and the mole percent of the calcium oxide in the total mass of the electrolyte is 0.001-20%.

7. The electrolysis is carried out at the temperature of 500-1,000° C.

8. The electrolytic voltage is lower than the theoretical decomposition potential of the electrolyte; the electrolytic current density is greater than the background current density of the electrolytic cell; the electrolytic time is the time required for the electrolytic quantity achieving the required theoretical electric quantity or more.

9. The preparation method according to claim 1, wherein the product can be taken out from melt salt along with a working electrode after the electrolytic process is finished, if necessary, the porous block electrode composed of the carbon and the silica can begin a new round of electrolysis, so as to achieve continuous production of the nano silicon-carbon composite material.

10. The preparation method according to claim 1, wherein the electrolytic product is cooled to room temperature under an inert atmosphere after being taken out, and the fully washed in dilute inorganic acid, water and an organic solvent; molten salt electrolyte mixed in the product is removed; and the dilute inorganic acid can be hydrochloric acid with the volume percent of 1%-3%.

11. The preparation method according to claim 1, wherein the washed electrolytic product is dried in vacuum for over 12 hours.

12. The preparation method according to claim 1, wherein the dried electrolytic product is grinded, crushed and screened, so as to obtain the nano silicon-carbon composite material.

The following embodiments are used for explaining the invention, and the "nano $SiO_2$ powder" in the raw materials disclosed by the embodiments is the powder of which the particle size is smaller than 100 nm.

Embodiment 1

Figure 2:
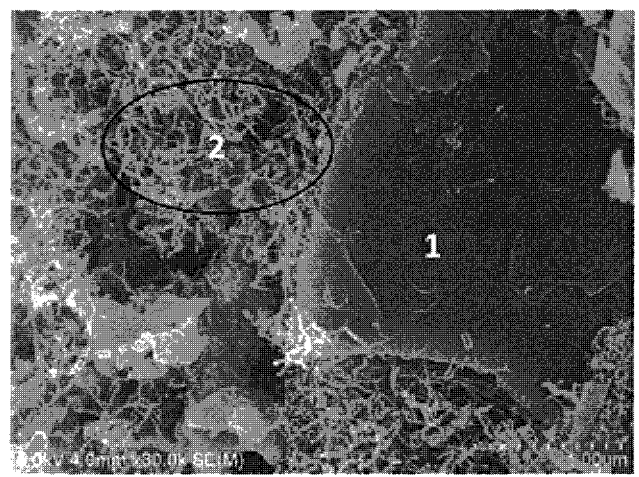
FIG. 2 is a scanning electron microscope (SEM) image of the silicon nanowire composite material grown on a graphite flake and prepared from the mixture of the graphite flake and the silica as raw materials at 950° C. disclosed by the invention in the embodiment 1, wherein 1 is the carbon matrix and 2 is the nano silicon wire.
Figure 3:
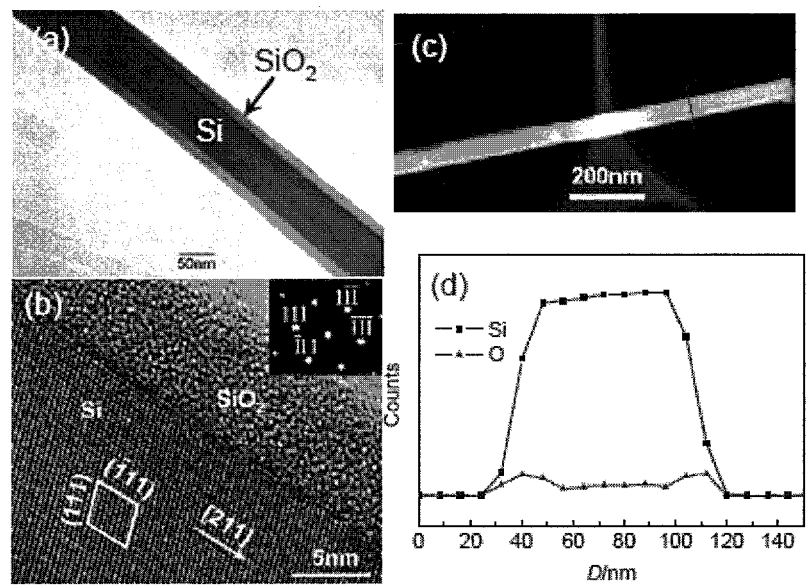
FIG. 3 is structure and constituent analysis images of a single silicon nanowire grown on the graphite flake and prepared from the mixture of the graphite flake and the silica as raw materials at 950° C. disclosed by the invention in the embodiment 1: (a) a TEM image, (b) an HRTEM image, (c) an STEM image, and (d) an EDS line scanning image.
Figure 4:
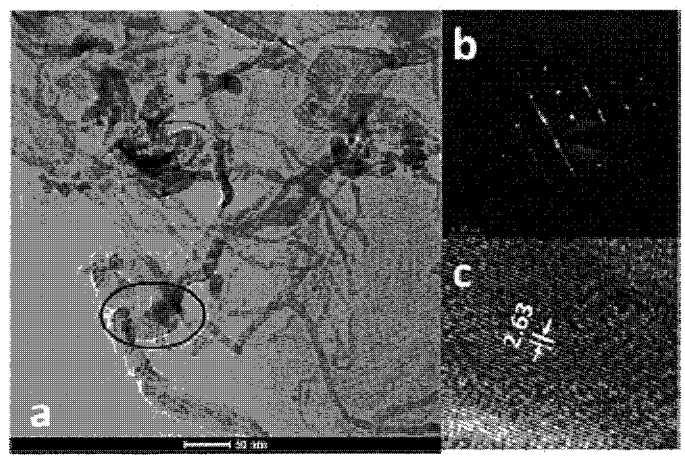
FIG. 4 is structure analysis images of the silicon nanowire composite material grown on the graphite flake and prepared from the mixture of the graphite flake and the silica as raw materials at 950° C. disclosed by the invention in the embodiment 1: a, a transmission electron microscope (TEM) image, b, a selected area electronic diffraction pattern (SEAD) image, and c, a high resolution transmission electron microscope (HRTEM) image.
Figure 5:
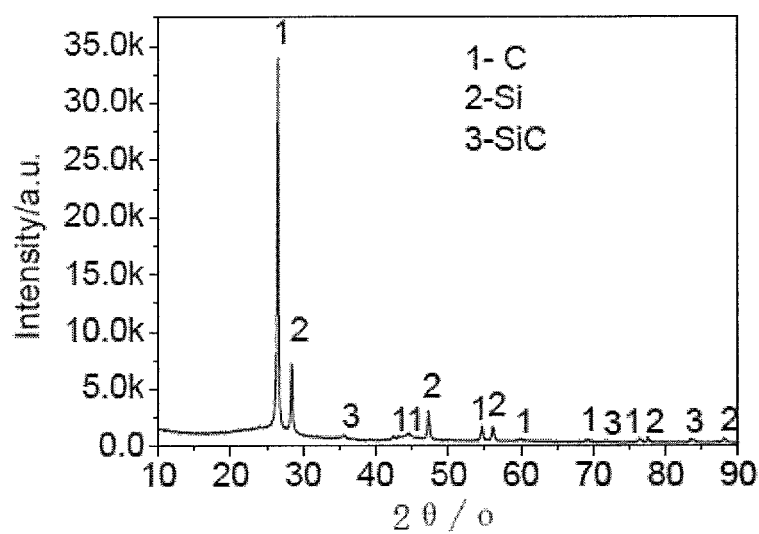
FIG. 5 is an X-ray diffraction pattern of the nano silicon carbon composite material prepared at 950° C. disclosed by the invention in the embodiment 1.

50 wt % of nano $SiO_2$ powder of which the purity is 99.95% is added to deionized water of which the mass percent of the silica is 300% to prepare the silica sol in a planetary agitation tank, wherein the agitation time is 10 hours; and then 50 wt % (totaling 100% of total weight of the $SiO_2$ powder and the graphite flake) of graphite flake of which the particle size is 3-6 μm is added to the silica sol, and evenly mixed by adopting a kneading machine; the evenly agitated slurry is dried in a forced air drying mode, the dried material is subjected to heat preservation for 2 hours under the conditions of 20 MPa of mechanical pressure, 1300° C., and argon, to press into a porous disc of which the diameter is about 80 mm and the thickness is 10 mm, the porosity is 21 vol %, the density is 1.70 g/cm$^3$, and the resistivity is 0.08 Ω·cm. The disc and the conductive cathode collector are compounded and taken as the cathode, a graphite rod is taken as an anode, and $CaCl_2$ is taken as electrolyte, constant-voltage electrolysis is carried out by adopting a voltage stabilizer to control the voltage in the environment of argon when the temperature is 950° C., and cell voltage is 2.5V. The electrolytic product is orderly rinsed by 1% of diluted hydrochloric acid, water and absolute ethyl alcohol after electrolysis for 12 hours, dried in vacuum, and screened, so as to obtain the product nano silicon-carbon composite material. The mass percent of the carbon in the nano silicon-carbon composite material is 67%, the mass percent of the nano silicon is 29%, the mass percent of the silicon carbide is 1%, and the content of the silicon oxide $SiO_2$ is 3%, namely, 67C29Si1SiC3$SiO_2$. From the scanning electron microscope (SEM) image (shown in FIG. 2) of the material, it can be seen that a linear nano silicon material grows on the graphite flake. In FIG. 2, a nano silicon wire 2 grows on the carbon matrix 1; the TEM image (FIG. 3a) of a single silicon nanowire 2 in a black coil in FIG. 2 proves that the silicon nanowire is in a core-shell structure; the middle pat is about 80 nm; the thickness of the outer layer is 5 nm. FIG. 3b is an HRTEM image of the silicon nanowire. From the image, it can be seen that in the core-shell structure of the silicon nanowire, the internal regular lattice fringe indicates that the core is in a single-crystal structure and the external shell is in an amorphous structure. The distance between internal single-crystal surfaces is 0.31 nm, and corresponds to the {111} interplanar distance of a diamond cubic structure in calculation according to Digital Micrograph provided by the HRTEM test. FIG. 3d is a line scanning analysis result of an energy dispersion X-ray spectrum (EDS) of the single silicon nanowire in FIG. 3c. From the image, it can be seen that the Si and O show different laws along radial direction of the silicon nanowire. The middle part of the silicon nanowire mainly is a silicon element, the beginning and finishing parts of online scanning of an oxygen element are obviously higher than the middle part. The experiment result directly reflects that the silicon nanowire forms the core by monocrystalline silicon and is coated with amorphous silica on the surface to form the core-shell structure. From the TEM picture (FIG. 4a) of the nano silicon-carbon composite material, it can be clearly seen that the linear nano silicon directly grows on the graphite flake, and the selected area electron diffraction SEAD pattern (FIG. 4b) of the interface (a black circle in FIG. 4a) of the nano silicon wire and the graphite flake indicates that the interface is a crystal SiC diffraction pattern; FIG. 4c is the HETRM image of the interface; the high-resolution two-dimensional image displays the interplanar distance d value of the interface as 0.263 nm, which just is the interplanar distance of beta-SiC (111), which accords with the test result of the XRD (FIG. 5). It is indicated that the nano silicon carbide exists at the interface of the nano silicon wire and the graphite flake matrix.

An electrode of a lithium ion battery is prepared from the composite materials by the following steps: taking the prepared electrolytic product nano silicon-carbon composite material as an active substance, Super-P carbon black as a conductive agent and PVDF as a binder and evenly mixing them according to the mass ratio of 7:2:1; taking N-methyl-2-pyrrolidinone as a solvent to obtain a slurry; coating the slurry on a copper foil with thickness of 8 μm to prepare a electrode sheet with the size of 1.0 cm*1.5 cm; drying at 70° C. and rolling into the required thickness of the electrode sheet; drying in vacuum at 120° C. for 12 hours so as to use; taking a metal lithium sheet as a counter electrode, a Celgard 2300 film as a diaphragm and 1 mol/L of $LiPF_6$/EC+DEC+DMC (the volume ratio is 1:1:1) as electrolyte to assemble a test battery (custom designing, diameter Ω=30 mm, and length L=100 mm). The charge and discharge performances of the test battery are tested by a blue electric battery test system CT2001A tester. The charge and discharge voltage range is 0.005-2.0V, the charge and discharge current density is 80 mA/g, and the capacity retention ratio of the test battery after cycling for 100 weeks is $C_{100}/C_1$.

Embodiment 2

65 wt % of nano $SiO_2$ powder of which the purity is 99.95% is added to ethylene glycol of which the mass percent of the silica is 100% to prepare the silica sol in the planetary agitation tank, wherein the agitation time is one hour; and then 35 wt % (totaling 100% of total weight of the $SiO_2$ powder and the carbon fiber) of commercially available carbon fiber of which the diameter is 20-150 nm and the length is 2-10 μm is added to the silica sol, evenly mixed by adopting the kneading machine; and the mixture of carbon fiber and $SiO_2$ is pressed into a disc of which the diameter is about 10 mm and the thickness is 1.5 mm under the mechanical pressure of 15 MPa; the disc is then sintered in manners of heating at 150° C. in argon for 1.5 hours, and then heated to 1100° C. and keeping the temperature for 3 hours to obtain a porous disc of which the porosity is 55 vol %, the density is 1.00 g/cm³, the resistivity is 98 Ω·cm. The disc and the conductive cathode collector are compounded and taken as the cathode, the graphite rod is taken as the anode, and $CaCl_2$ is taken as electrolyte, constant-voltage electrolysis is carried out by adopting a voltage stabilizer to control the voltage in the environment of argon when the temperature is 850° C., and the cell voltage is 2.9V. The electrolytic product is orderly rinsed by 1% of diluted hydrochloric acid, water and absolute ethyl alcohol after electrolysis for 6 hours, dried in vacuum, and screened, so as to obtain the carbon fiber-loaded nano silicon granular composite material 56C40Si1SiC3$SiO_2$. The constituent and structure analysis of the composite material is carried out according to the test method same as that in the embodiment 1.

The electrode is prepared from the composite material and the electrochemical property test is carried out according to the method same as that in the embodiment 1.

Embodiment 3

65 wt % of nano $SiO_2$ powder of which the purity is 99.95% is added to ethylene glycol of which the mass percent of the silica is 100% to prepare the silica sol in the planetary agitation tank, wherein the agitation time is one hour, and then 35 wt % (totaling 100% of total weight of the $SiO_2$ powder and the carbon fiber) of commercially available carbon fiber of which the diameter is 20-150 nm and the length is 2-10 μm is added to the silica sol, and evenly mixed by adopting the kneading machine; the mixed slurry is dried for 6 hours in an air atmosphere; the dried material is prepared into the porous block in a hot-pressing manner at 1000° C. after being mechanically crushed. The porosity of the porous block is 22 vol %; the density is 1.70 g/cm³; the resistivity is 0.5 Ω·cm. The porous block is machined into a rectangular block of which the length is 50 mm, the width is 30 mm and the height is 10 mm. The rectangular block and the conductive cathode collector are compounded and taken as the cathode; the graphite rod is taken as the anode, and $CaCl_2$ is taken as electrolyte, constant-voltage electrolysis is carried out by adopting a voltage stabilizer to control the voltage in the environment of argon when the temperature is 900° C., and the cell voltage is 2.8V. The electrolytic product is orderly rinsed by 1% of diluted hydrochloric acid, water and absolute ethyl alcohol after electrolysis for 5 hours, dried in vacuum, and screened, so as to obtain the product carbon fiber-loaded nano silicon granular composite material shown in the FIG. 1 wherein a nano silicon carbide sheet is dispersed on the nano silicon; the prepared carbon fiber-loaded nano silicon granular composite material is 57C38Si2SiC3$SiO_2$. The constituent and structure analysis of the composite material is carried out according to the test method same as that in the embodiment 1.

The electrode is prepared from the composite material and the electrochemical property test is carried out according to the method same as that in the embodiment 1.

Embodiment 4

40 wt % of nano $SiO_2$ powder of which the purity is 99.95% is added to ethylene glycol of which the mass percent of the silica is 80% to prepare the silica sol in the planetary agitation tank, wherein the agitation time is two hours, and then 60 wt % (totaling 100% of total weight of the $SiO_2$ powder and similar spherical graphite) of similar spherical graphite of which the particle size is 10-21 μm is added to the silica sol and mixed for 5 hours by adopting a continuous kneading machine; the evenly mixed slurry is put into a cuboid mold of which the length is 50 mm, the width is 30 mm and the height is 10 mm, dried at 120° C. and demolded after being dried; the demolded rectangular block is sintered for 2 hours in argon atmosphere at 1400° C., so as to prepare a porous cuboid. The porosity of the porous block is 32 vol %; the density is 1.50 g/cm³; the resistivity is 0.18 Ω·cm. The rectangular block and the conductive cathode collector are compounded and taken as the cathode;

the graphite rod is taken as the anode, and $CaCl_2$ is taken as electrolyte, constant-voltage electrolysis is carried out by adopting a voltage stabilizer to control the voltage in the environment of argon when the temperature is 800° C. The cell voltage is maintained at 2.8V for 4 hours and then converted into constant current density electrolysis. The electrolytic product is orderly rinsed by 1% of diluted hydrochloric acid, water and absolute ethyl alcohol after electrolysis for 20 hours, dried in vacuum, and screened, so as to obtain the similar spherical graphite-loaded silicon nanowire composite material $75C21Si0.5SiC3.5SiO_2$. The constituent and structure analysis of the composite material is carried out according to the test method same as that in the embodiment 1.

The electrode is prepared from the composite material and the electrochemical property test is carried out according to the method same as that in the embodiment 1.

Embodiment 5

20 wt % of nano $SiO_2$ powder of which the purity is 99.9% and the particle size is 0.2 microns is added to ethylene glycol of which the mass percent of the silica is 70% to prepare the silica sol in the planetary agitation tank, wherein the agitation time is two hours, and then 50 wt % of flake graphite of which the particle size is 3-6 μm and 30 wt % of carbon fiber of which diameter is 20-200 nm and the length is 5-10 μm are orderly added to the silica sol; distilled water of which the weight is 90% of that of the solid powder is added to the mixture (totaling 100% of total weight of the $SiO_2$ powder, the flake graphite and the carbon fiber); mechanical intense agitation is carried out for 4 hours by adopting a planetary ball mill; the evenly agitated slurry is prepared into the rectangular block of which the length is 50 mm, the width is 30 mm and the height is 10 mm in mold filling and molding manners; the rectangular block is sintered for 3 hours in argon atmosphere at 1200° C., so as to prepare the porous cuboid. The porosity of the porous block is 40 vol %; the density is 1.32 g/cm³; the resistivity is 0.3 Ω·cm. The rectangular block and the conductive cathode collector are compounded and taken as the cathode; the graphite rod is taken as the anode, and $CaCl_2$ is taken as electrolyte, constant-voltage electrolysis is carried out by adopting a voltage stabilizer to control the current density in the environment of argon when the temperature is 800° C., and the current density is 3000 A/cm². The electrolytic product is orderly rinsed by 1% of diluted hydrochloric acid, water and absolute ethyl alcohol after electrolysis for 20 hours, dried in vacuum, and screened, so as to obtain the product nano silicon-carbon composite material $85C9Si3SiC3SiO_2$. The constituent and structure analysis of the composite material is carried out according to the test method same as that in the embodiment 1.

The electrode is prepared from the composite material and the electrochemical property test is carried out according to the method same as that in the embodiment 1.

Embodiment 6

65 wt % of nano $SiO_2$ powder of which the purity is 99.95% is added to ethylene glycol of which the mass percent of the silica is 100% to prepare the silica sol in the planetary agitation tank, wherein the agitation time is one hour, and then 25 wt % of commercially available carbon fiber of which the diameter is 20-150 nm and the length is 2-10 μm is added to the silica sol; 10 wt % of phenolic resin anhydrous ethanol solution containing pyrolytic carbon is added; mechanical intense agitation is carried out for 12 hours by adopting a planetary ball mill; the evenly agitated slurry is dried by adopting a microwave drying mode; the dried material is prepared into the rectangular block of which the length is 50 mm, the width is 30 mm and the height is 10 mm in a manner of molding under mechanical pressure; the rectangular block is warmed to 1300° C. after being heated for about 1.5 hours in argon at 150° C. and then kept warm for 3 hours, so as to prepare the porous rectangular block by sintering the mixture of carbon fiber, the $SiO_2$ and the phenolic resin and pyrolytic carbon. The porosity of the porous block is 32 vol %; the density is 1.50 g/cm³; the resistivity is 0.45 Ω·cm. The rectangular block and the conductive cathode collector are compounded and taken as the cathode; the graphite rod is taken as the anode, and $CaCl_2$ is taken as electrolyte, constant-voltage electrolysis is carried out by adopting a voltage stabilizer to control the voltage in the environment of argon when the temperature is 850° C., and the cell voltage is 2.9V. The electrolytic product is orderly rinsed by 1% of diluted hydrochloric acid, water and absolute ethyl alcohol after electrolysis for 10 hours, dried in vacuum, and screened, so as to obtain the product nano silicon-carbon composite material $57C39Si1SiC3SiO_2$. The constituent and structure analysis of the composite material is carried out according to the test method same as that in the embodiment 1.

The electrode is prepared from the composite material and the electrochemical property test is carried out according to the method same as that in the embodiment 1.

Embodiment 7

40 wt % of nano $SiO_2$ powder of which the purity is 99.95% is added to deionized water of which the mass percent of the silica is 200% to prepare the silica sol in the planetary agitation tank, wherein the agitation time is 4 hours, and then 45 wt % of commercially available graphite flake of which the particle size is 6 μm is added to the silica sol; 15 wt % of asphalt containing pyrolytic carbon is added; mechanical intense agitation is carried out for 12 hours at 100° C.; the evenly agitated slurry is dried by adopting a microwave drying mode; the dried material is prepared into the rectangular block of which the length is 50 mm, the width is 30 mm and the height is 10 mm in a manner of molding under mechanical pressure; the rectangular block is warmed to 1100° C. after being heated for about 1.5 hours in argon at 150° C. and then kept warm for 3 hours, so as to prepare the porous rectangular block by sintering the mixture of graphite flake, the $SiO_2$ and the asphalt and pyrolytic carbon. The porosity of the porous block is 36 vol %; the density is 1.40 g/cm³; the resistivity is 0.60 Ω·cm. The rectangular block and the conductive cathode collector are compounded and taken as the cathode; the graphite rod is taken as the anode, and $CaCl_2$ is taken as electrolyte, constant-voltage electrolysis is carried out by adopting a voltage stabilizer to control the voltage in the environment of argon when the temperature is 950° C., and the cell voltage is 2.6V. The electrolytic product is orderly rinsed by 1% of diluted hydrochloric acid, water and absolute ethyl alcohol after electrolysis for 12 hours, dried in vacuum, and screened, so as to obtain the product nano silicon-carbon composite material $72C24Si1SiC3SiO_2$. The constituent and structure analysis of the composite material is carried out according to the test method same as that in the embodiment 1.

Embodiment 8

40 wt % of nano $SiO_2$ powder of which the purity is 99.95% is added to deionized water of which the mass percent of the silica is 200% to prepare the silica sol in the planetary agitation tank, wherein the agitation time is 4 hours, and then 45 wt % of commercially available graphite flake of which the particle size is 6 μm is added to the silica sol; 15 wt % of asphalt containing pyrolytic carbon is added; mechanical intense agitation is carried out for 12 hours at 100° C.; the evenly agitated slurry is dried by adopting a microwave drying mode; the dried material is prepared into the rectangular block of which the length is 50 mm, the width is 30 mm and the height is 10 mm in a manner of molding under mechanical pressure; the rectangular block is warmed to 1100° C. after being heated for about 1.5 hours in argon at 150° C. and then kept warm for 3 hours, so as to prepare the porous rectangular block by sintering the mixture of graphite flake, the $SiO_2$ and the asphalt and pyrolytic carbon. The porosity of the porous block is 36 vol %; the density is 1.40 g/cm$^3$; the resistivity is 0.60 Ω·cm. The rectangular block and the conductive cathode collector are compounded and taken as the cathode; the graphite rod is taken as the anode, and $CaCl_2$—NaCl (80:20 mol %) is taken as electrolyte, constant-voltage electrolysis is carried out by adopting a voltage stabilizer to control the voltage in the environment of argon when the temperature is 750° C., and the cell voltage is 2.8V. The electrolytic product is orderly rinsed by 1% of diluted hydrochloric acid, water and absolute ethyl alcohol after electrolysis for 12 hours, dried in vacuum, and screened, so as to obtain the product nano silicon-carbon composite material 72C24Si1SiC3SiO$_2$. The constituent and structure analysis of the composite material is carried out according to the test method same as that in the embodiment 1.

Embodiment 9

40 wt % of nano $SiO_2$ powder of which the purity is 99.95% is added to deionized water of which the mass percent of the silica is 200% to prepare the silica sol in the planetary agitation tank, wherein the agitation time is 4 hours, and then 45 wt % of commercially available graphite flake of which the particle size is 6 μm is added to the silica sol; 15 wt % of asphalt containing pyrolytic carbon is added; mechanical intense agitation is carried out for 12 hours at 100° C.; the evenly agitated slurry is dried by adopting a microwave drying mode; the dried material is prepared into the rectangular block of which the length is 50 mm, the width is 30 mm and the height is 10 mm in a manner of molding under mechanical pressure; the rectangular block is warmed to 1100° C. after being heated for about 1.5 hours in argon at 150° C. and then kept warm for 3 hours, so as to prepare the porous rectangular block by sintering the mixture of graphite flake, the $SiO_2$ and the asphalt and pyrolytic carbon. The porosity of the porous block is 36 vol %; the density is 1.40 g/cm$^3$; the resistivity is 0.60 Ω·cm. The rectangular block and the conductive cathode collector are compounded and taken as the cathode; the graphite rod is taken as the anode, and $CaCl_2$—LiCl—KCl (36.1:52.3:11.6 mol %) is taken as electrolyte, constant-voltage electrolysis is carried out by adopting a voltage stabilizer to control the voltage in the environment of argon when the temperature is 600° C., and the cell voltage is 2.9V. The electrolytic product is orderly rinsed by 1% of diluted hydrochloric acid, water and absolute ethyl alcohol after electrolysis for 12 hours, dried in vacuum, and screened, so as to obtain the product nano silicon-carbon composite material 72C24Si1SiC3SiO$_2$. The constituent and structure analysis of the composite material is carried out according to the test method same as that in the embodiment 1.

The electrode is prepared from the composite material and the electrochemical property test is carried out according to the method same as that in the embodiment 1.

Contrast Example 1

The nano silicon-carbon composite material 75C25Si is prepared by adopting a chemical vapor deposition method to form the silicon nanowire grown on the graphite flake, and is subjected to the electrochemical property test by adopting the same condition, and compared with the electrochemical property test results of the embodiments.

Contrast Example 2

10 wt % of nano silicon particles of which the mean particle size is 15 nm and cane sugar of which the carbon content is 3 wt % are orderly added to 1,000 ml of absolute ethyl alcohol, and dispersed by mechanical strength for 4 hours; 87 wt % of graphite flake which is the same as that in the embodiment 3 in model number is added, and then 250 ml of absolute ethyl alcohol is added; the slurry is dispersed by a nano sand mill for 2 hours; the turbid liquid is added to a spray dryer to carry out spray drying, so as to prepare precursor. The precursor is contained in a graphite crucible, put into a well-type resistance furnace, and subjected to thermal treatment under protection of the argon. The pyrolysis temperature is 900° C. The nano silicon-carbon composite material 90C9Si1SiC is obtained from the obtained sample after screening by a 300 mesh sieve. The nano silicon-carbon composite material 90C9Si1SiC is subjected to the electrochemical property test by adopting the same condition, and compared with the electrochemical property test results of the embodiments. The results are shown in the table 1.

TABLE 1

Electrochemical properties of the nano silicon-carbon composite material

| Embodiment number | First insertion-lithium capacity mAh/g | First coulombic efficiency % | Capacity retention ratio after cycling for 100 weeks % |
|---|---|---|---|
| Embodiment 1 | 1408 | 81 | 93 |
| Embodiment 2 | 1484 | 84 | 81 |
| Embodiment 3 | 1105 | 85 | 96 |
| Embodiment 4 | 856 | 78 | 90 |
| Embodiment 5 | 624 | 80 | 97 |
| Embodiment 6 | 1680 | 72 | 99 |
| Embodiment 7 | 1082 | 88 | 98 |
| Embodiment 8 | 1124 | 79 | 98 |
| Embodiment 9 | 1236 | 78 | 98 |
| Contrast example 1 | 1170 | 81 | 67 |
| Contrast example 2 | 652 | 80 | 85 |

The invention claimed is:

1. A silicon-carbon composite material for lithium ion batteries, characterized by comprising carbon matrix, silicon dispersed on the carbon matrix, silicon carbide SiC dispersed on the interface of the carbon matrix and the silicon, and silicon oxide SiOx coated on the surface of the silicon except for the interface connected with the carbon matrix, wherein 0<x≤2.

2. The silicon-carbon composite material for lithium ion batteries of claim 1, wherein the mass percent of the components is as follows: 2-40% of silicon, 55-90% of carbon, 0.1-3% of SiC and 1-5% of silicon oxide SiOx.

3. The silicon-carbon composite material for lithium ion batteries of claim 1, wherein the mass percent of the silicon is 5-35%.

4. The silicon-carbon composite cathode material for lithium ion batteries of claim 1, wherein the mass percent of the carbon is 60-85%.

5. The silicon-carbon composite material for lithium ion batteries of claim 1, wherein the carbon is in at least one selected from the group consisting of a spherical shape, a similar spherical shape, a flake shape, a linear shape and a tubular shape.

6. The silicon-carbon composite material for lithium ion batteries of claim 1, wherein the silicon is at least one selected from the group consisting of a silicon line, a silicon spherical particle, a silicon tube and a silicon sheet.

7. The silicon-carbon composite material for lithium ion batteries of claim 6, wherein the particle size of the silicon spherical particle is smaller than 100 nm; the diameter of the silicon line is smaller than 100 nm; the diameter of the silicon tube is smaller than 100 nm; the thickness of the silicon sheet is smaller than 100 nm.

8. The silicon-carbon composite material for lithium ion batteries of claim 1, wherein the silicon carbide SiC is in at least one selected from the group consisting of a granular shape, a linear shape and a flake shape.

9. The silicon-carbon composite material for lithium ion batteries of claim 8, wherein the particle size of the granular SiC is smaller than 100 nm; the diameter of the linear SiC is smaller than 100 nm; the thickness of the flake SiC is smaller than 100 nm.

10. A preparation method of the silicon-carbon composite material for lithium ion batteries of claim 1, comprising the following steps: firstly, preparing silica sol from silica powder, and then adding a carbon particle feed to the silica sol, wherein the mass percent of the silica powder is 10-90 wt %, the mass percent of the carbon particle is 90-10 wt %, and the total mass of the silica powder and the carbon particle material is 100 wt %; evenly mixing, and forming a mixture of carbon and silica by drying and crushing; forming a porous block from the mixture in a hot-pressing manner, or sintering the mixture into a porous block after mold pressing or mold filling; controlling the porosity, the density and the resistivity of the porous block; compounding the porous block composed of the carbon and the silica with a conductive cathode collector as a cathode; using graphite or an inert anode as an anode, and putting the cathode and anode into $CaCl_2$ electrolyte or mixed salt melt electrolyte containing $CaCl_2$ to form an electrolytic cell; applying voltage between the cathode and the anode; controlling the electrolytic voltage, the electrolytic current density and the electrolytic quantity, so that the silica in the porous block is deoxidized into the silicon by electrolytic reduction, and the silicon-carbon composite material for lithium ion batteries is prepared at the cathode.

11. The preparation method of claim 10, wherein the particle size of the silica powder is from 10 nm to 1 μm.

12. The preparation method of claim 10, wherein the carbon particle material is at least one selected from the group consisting of natural graphite, artificial graphite, amorphous carbon and carbon tube.

13. The preparation method of claim 10, wherein the particle size of the carbon particle material is from 10 nm to 50 μm.

14. The preparation method of claim 10, wherein the hot-pressing temperature is 900-1400° C.; the hot-pressing pressure is 8-40 MPa; the heat preservation time is 1-5 hours; the sintering temperature is 800-1500° C.; the sintering time is 1-8 hours.

15. The preparation method of claim 10, wherein the porosity of the porous block is 5-65 vol %.

16. The preparation method of claim 10, wherein the density of the porous block is 0.80-2.10 g/cm$^3$.

17. The preparation method of claim 10, wherein the resistivity of the porous block is 0.001-100 Ω·cm.

18. The preparation method of claim 10, wherein the mixed salt melt electrolyte containing $CaCl_2$ is $CaCl_2$+MY$^1$, wherein the mole percent of the $CaCl_2$ is 40-95%; the allowance is MY$^1$; M is Ba, Li, Al, Cs, Na, K, Mg, Rb, Be or Sr; Y$^1$ is Cl or F.

19. The preparation method of claim 10, wherein the electrolyte comprises calcium oxide CaO, and the mole percent of the calcium oxide in the total mass of the electrolyte is 0.001-20%.

20. The preparation method of claim 10, wherein electrolysis is carried out at the temperature of 500-1,000° C.

21. The preparation method of claim 10, wherein the electrolytic voltage is lower than the theoretical decomposition potential of the electrolyte; the electrolytic current density is greater than the background current density of the electrolytic cell; the electrolytic time is the time required for achieving the required theoretical electrolytic quantity or more by the required theoretical electrolytic quantity.

22. A lithium ion battery, comprising a positive electrode, a negative electrode and non-aqueous electrolyte, wherein the negative electrode comprises the silicon-carbon composite material of claim 1.

* * * * *